UNITED STATES PATENT OFFICE 2,648,617

FILTER MEDIUM AND METHOD OF MAKING THE SAME

Norman D. Hanson, Bloomfield, N. J., assignor, by mesne assignments, to Union Carbide and Carbon Corporation, a corporation of New York No Drawing. Application September 2, 1948, Serial No. 47,550

8 Claims. (Cl. 117—155)

This invention relates to filters for separating fine solids carried in liquids, such as the sludge present in lubricating oils. Paper is principally used for this purpose, and the problem is that of protecting the paper fibers from the weakening action of water and yet not fill the pores of the paper. It has been proposed to impregnate the paper with thermoset resins of the phenolformaldehyde type (see Wells, U. S. Patent 2,103,572); these resins, however, make the paper brittle with a consequent tendency to crack and permit the passage of sludge. Consequently the art has sought other stable media for the protection of the fibers without interfering with the porosity of the paper or destroying its flexibility.

According to the present invention these objects are attained by the impregnation of paper or fabric with an ester resulting from the condensation of a polyhydric alcohol with a dienoic monoacid having conjugated bonds in the 2,4 position. Esters of this character require no heating to temperatures having a weakening or brittlizing effect on cellulosic fibers and in fact they can be set to tough, insoluble films by exposure to air at room temperatures; these liquid esters accordingly have the characteristics of a drying oil in becoming hard through the absorption of oxygen and are similar in structure and properties to drying oils. Surprisingly, fibrous bases can be so impregnated as to retain a porosity to a degree that secures an optimum filtering action by the medium without interfering with flexibility or creating any danger of cracking. Moreover, an increased life is found to be imparted to a paper filter by means of the impregnant.

Polyhydric alcohols to form the esters include alkylene glycols and polyglycols, glycerols and polyglycerols, erythritol and pentaerythritol and their polymers, sorbitol, mannitol, trimethylolpropane, polyhydroxyethyl-benzenes, etc.; the foregoing can be seen to be primarily alcohols consisting of linked hydrocarbons having hydroxyl replacements for hydrogen atoms on different carbon atoms, though in polymerized form they may take on an ether structure as a result of condensation and dehydration. Normally the alcohol is present in excess of stoichiometric proportions.

The diene monoacids for preparing the esters, to which this invention is directed, are aliphatic acids having ethylenic bonds in conjugation and one of these bonds in conjugation with the carbonyl group; they comprise those acids having a straight chain skeletal structure

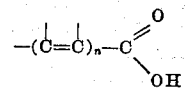

wherein $n$ is 2 to 4, and those acids having a cross-conjugate chain skeletal structure

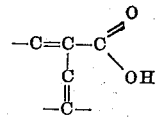

wherein the indicated free valencies are satisfied by hydrogen, alkyl, alkenyl or aryl groups. In addition to sorbic acid, straight chain acids of primary interest include β-vinyl-acrylic, octatrien-(2,4,6)-oic, decatetraen-(2,4,6,8)-oic, and β-styryl-acrylic; but α-methyl-sorbic, α-ethyl-sorbic, γ-ε-dimethyl-sorbic, β-δ-dimethyl-sorbic, α-methyl-γ-benzal-crotonic, α-ethyl-α-phenyl-α-γ-butadiene-α-carboxylic, 2,6-dimethyl-deca-trien-(2,6,8)-oic-(10), etc., likewise form esters as herein disclosed. Examples of the cross-conjugate acids are α-β-isopropylidene-propionic, α-vinyl-cinnamic, α-isopropenyl-cinnamic, α-isopropenyl-furfural-acetic, α-isopropenyl-cinnamenyl-acrylic, etc.

Direct esterification by the condensation of an excess of the polyhydric alcohol over stoichiometric proportions with the dienoic acid is possible through a restriction of the temperature to 170° C. or below as by means of a solvent forming an azeotropic mixture with water, such as hydrocarbon thinners (benzene, toluene, etc.), and by the inclusion of a strong mineral acid, such as sulfuric acid, as a catalyst.

For the impregnation of paper or other porous filter material, a web of the material can be passed through a solution of the ester, dried and then set by baking to the hardened state. To illustrate, an ester was prepared from sorbic acid and glycerol under the conditions above stated in xylol as the solvent. A web of porous kraft paper of about 8 mils thickness was passed through a bath of the solution, which was adjusted so that the web contained about 30 per cent of the ester upon removal of the solvent. The so-impregnated web was baked for 30 minutes at about 250° F. (120° C.), and at the end of the period the ester was in a hardened and resistant condition. No deteriorating or weakening action was noted when a sample of the baked web was immersed for 24 hours in water at 170° F. It was tested for filtering by passing used motor oil through the impregnated and cured paper; the sludge contained in the oil separated at the surface of the paper, and about 3 or 4 passes through a single thickness was sufficient to clear the oil from sludge.

The test was repeated with variations in the amount of the ester retained in the paper; with 35 per cent ester content the filtering action was considered very good, though there was some build up in back pressure. As little as 5 per cent of the ester contributes a noticeable improvement in extending the life of a paper web and preventing deterioration, and up to 50 per cent or more can be included without destruction of the porous character of the web.

To speed up the hardening of the resinous ester, cobalt drier can be included in the customary amounts of a fraction of one per cent based on the weight of the ester; it is not necessary, however, to include a drier. Also the impregnated web can be dried at a low temperature, corresponding to the boiling point of the solvent used, or at higher temperature (130° C.) for a few (5) minutes and then baked at 150° C. for about 5 minutes; kraft paper so treated at the high temperature to a 30 per cent ester content retained its porosity and did not become limp in water. As a further variation, it is not essential that solutions as such be used for impregnation; satisfactory impregnation was obtained by means of a dispersion in the form of an emulsion in water of the ester dissolved in a thinner as toluol (40 to 60 per cent solids), and insuring the emulsion stability by an agent such as ammonium oleate.

The application is not limited to paper, and any porous structure, such as woven cloth of cotton, glass, asbestos, etc. or matted webs or felts of fibers, ranging from thin sheets to boards of one-half inch and more in thickness, can be treated to improve the life and resistance to the action of water.

What is claimed is:

1. Filter medium capable of filtering sludge from lubricating oil, and characterized by flexibility and resistance to the action of water comprising a porous fibrous structure impregnated with a polyhydric alcohol ester of an aliphatic diene-monoacid having ethylenic bonds and one of these bonds in conjugation with the carbonyl group, said ester being in an insoluble condition and in amount retaining the porosity of the structure for a filtering action.

2. Filter medium capable of filtering sludge from lubricating oil, and characterized by flexibility and resistance to the action of water comprising a porous fibrous sheet structure impregnated with the glycerol ester of sorbic acid to the extent of five to fifty per cent by weight of the medium, said ester being in an insoluble condition.

3. Filter medium capable of filtering sludge from lubricating oil, and characterized by flexibility and resistance to the action of water comprising porous paper impregnated with about 30 to 35 per cent content by weight of the glycerol ester of sorbic acid, said ester being hardened by absorption of oxygen.

4. Method of preparing a filter medium capable of filtering sludge from lubricating oil, and characterized by flexibility and resistance to the action of water which comprises impregnating a porous fibrous structure with a solution of a polyhydric alcohol ester of an aliphatic diene-monoacid having ethylenic bonds and one of these bonds in conjugation with the carbonyl group in an amount retaining the porosity of the structure for a filtering action, and baking the impregnated structure to remove solvent and set the ester to a hardened condition.

5. Method of preparing a filter medium capable of filtering sludge from lubricating oil, and characterized by flexibility and resistance to the action of water which comprises impregnating a porous fibrous structure with a solution in hydrocarbon thinner of the glycerol ester of sorbic acid in an amount retaining the porosity of the structure for a filtering action, and baking at the distillation temperature or above to remove the solvent and set the ester to a hardened condition.

6. Method of preparing a filter medium capable of filtering sludge from lubricating oil, and characterized by flexibility and resistance to the action of water which comprises impregnating a porous structure with a water-emulsion of a hydrocarbon solution of the glycerol ester of sorbic acid in an amount retaining the porosity of the structure for a filtering action, and baking at the distillation temperature of the hydrocarbon or above to set the ester to a hardened condition.

7. Method of preparing a filter medium capable of filtering sludge from lubricating oil, and characterized by flexibility and resistance to the action of water which comprises impregnating a porous fibrous structure with a polyhydric alcohol ester of an aliphatic diene-monoacid having ethylenic bonds and one of these bonds in conjugation with the carbonyl group in amount retaining the porosity of the structure for a filtering action, and baking the impregnated structure to set the ester to a hardened condition.

8. Method of preparing a filter medium capable of filtering sludge from lubricating oil, and characterized by flexibility and resistance to the action of water which comprises impregnating a web of porous paper with a solution in hydrocarbon thinner of the glycerol ester of sorbic acid to the extent of 5 to 50% by weight of the paper and baking the impregnated paper at a temperature of about 120° C. to 150° C. to set the ester to a hardened condition.

NORMAN D. HANSON.

References Cited in the file of this patent

UNITED STATES PATENTS

| Number | Name | Date |
|---|---|---|
| 1,222,100 | Hanson | Apr. 10, 1917 |
| 1,975,246 | Zwilgmeyer | Oct. 2, 1934 |
| 2,291,079 | Hofferbert | July 28, 1942 |
| 2,381,880 | Cupery | Aug. 14, 1945 |
| 2,462,337 | Shechter | Feb. 22, 1949 |

FOREIGN PATENTS

| Number | Country | Date |
|---|---|---|
| 389,086 | Germany | Jan. 25, 1924 |